United States Patent
Umekida

(10) Patent No.: US 7,044,647 B2
(45) Date of Patent: May 16, 2006

(54) WHEEL BEARING DEVICE

(75) Inventor: Mitsuru Umekida, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 153 days.

(21) Appl. No.: 10/659,742

(22) Filed: Sep. 11, 2003

(65) Prior Publication Data

US 2004/0101224 A1 May 27, 2004

(30) Foreign Application Priority Data

Sep. 26, 2002 (JP) .......................................... 2002-281602

(51) Int. Cl.
*F16C 19/08* (2006.01)

(52) U.S. Cl. ....................... 384/537; 384/544
(58) Field of Classification Search ................ 384/537, 384/584, 585, 544, 589
See application file for complete search history.

(56) References Cited

U.S. PATENT DOCUMENTS

2003/0002761 A1 * 1/2003 Hagiwara .................. 384/537

2004/0022469 A1   2/2004 Ozawa et al.
2004/0165801 A1 * 8/2004 Webb et al. ................ 384/537

FOREIGN PATENT DOCUMENTS

| EP | 1 396 354 A1 | 3/2004 |
| EP | 1 398 181 A2 | 3/2004 |
| FR | 2 795 021 A1 | 12/2000 |

* cited by examiner

Primary Examiner—Lenard A. Footland
(74) Attorney, Agent, or Firm—Arent Fox PLLC

(57) ABSTRACT

A wheel bearing device to ensure a sufficient durability and life even with the application of bending moment acting on the wheel bearing device. An outer joint member of a constant velocity joint is fitted into the inside of a wheel hub and a portion thereof is swaged radially outward by plastic deformation to unite the wheel hub and the outer joint member. The outer joint member includes a pilot part adjacent the plastically deformed portion, and the ratio of an inside diameter $\Phi d2$ of the pilot part to an inside diameter $\Phi d1$ of the plastically deformed portion is set 1.110 or less.

7 Claims, 7 Drawing Sheets

Fig. 3

| φd2/φd1 | 1.040 | 1.050 | 1.060 | 1.070 | 1.080 | 1.090 | 1.100 | 1.110 | 1.120 | 1.130 |
|---|---|---|---|---|---|---|---|---|---|---|
| Stress concentration | ○ | ○ | ○ | △ | △ | △ | △ | △ | × | × |

WHEEL BEARING DEVICE

BACKGROUND OF THE INVENTION

1. Field of the Invention

The present invention relates to a wheel bearing device of a vehicle such as an automobile.

2. Description of the Related Art

Wheel bearing devices are generally classified into those for drive-wheel applications and for driven-wheel applications. A drive wheel bearing device is commonly composed of a wheel hub and a double-row bearing, or a unit of a wheel hub, a bearing, and a constant velocity joint.

One of the drive wheel bearing device designs has a construction in which one of the double-row inner races of the bearing is formed on the outer periphery of the wheel hub, while the other is formed on the outer periphery of an outer joint member of the constant velocity joint. In this type of bearing device, the wheel hub and the constant velocity joint need to be joined together to achieve relative positioning of the double-row inner races and to maintain certain preload applied to the inside of the bearing. There has been a new method of joining them by swaging as shown, e.g., in Japanese Patent Laid-Open Publication No. 2001-18605, for better use of axial space of the bearing and for the enhancement of the joint rigidity of a plastically deformed portion. With this method, a stem part of the outer joint member is expanded radially outward by plastic deformation so that it firmly engages with irregularities formed on the inner periphery of the wheel hub.

Generally, the wheel bearing device in a vehicle takes a large bending moment when the vehicle turns. Various constituent elements of the bearing device thus suffer from large, local bending stress because of this bending moment. The swaged type bearing device mentioned above does not give sufficient consideration to this point, and therefore it may have lower durability or shorter life than desired.

SUMMARY OF THE INVENTION

In view of the above, an object of the present invention is to provide a wheel bearing device that has high durability against bending moment and long life and that allows a swaging operation in a radially outward direction to be performed efficiently.

FIG. 1 shows a drive wheel bearing device adopting the swaging operation in the radially outward direction. The bearing device includes: an outer member 20 formed with double-row outer races 24 on an inner periphery thereof; an inner member 29 formed with double-row inner races 27, 28 on an outer periphery thereof, and provided with a wheel hub 10 having a flange 14 for attachment of a wheel, and an outer joint member 41 as a fitting member fitted into the wheel hub 10; and double-row rolling elements 22 interposed between the outer races 24 and the inner races 27, 28. The outer joint member 41 serving as a fitting member may be fitted to an outer periphery of the wheel hub 10 (see FIG. 5).

One of the wheel hub 10 and the outer joint member 41 that is located inside (i.e., the outer joint member 41 in the embodiment of FIG. 1) has a plastically deformed portion 34 radially expanded by plastic deformation to be coupled with the wheel hub 10 that is located outside and an adjacent part 35 (or a pilot part in the shown embodiment of FIG. 1) adjoining the plastically deformed portion 34 with a different inside diameter than that of the plastically deformed portion 34. Generally, in this type of wheel bearing device, the inside diameter $\Phi d1$ of the plastically deformed portion 34 is smaller than the inside diameter $\Phi d2$ of the adjacent part 35.

As shown in the enlarged view of FIG. 2, the wheel hub 10 is formed with irregularities 31 on the inside opposite the outer periphery of the plastically deformed portion 34 by broaching or the like. Pushing a swaging tool such as a punch 60, from right to left in the figure, into the inside of the outer joint member 41 to plastically deform the portion 34 in a radially outward direction, causes the outer periphery thereof to bite into the irregularities 31 on the inner periphery of the wheel hub 10, thereby joining the wheel hub 10 and the outer joint member 41. The pilot part 35 is fitted into the wheel hub 10 to support the bending moment acted upon between the wheel hub 10 and the outer joint member 41. In order to surely bite the plastically deformed portion 34 into the irregularities 31, the irregularities 31 should preferably be hardened by heat treatment.

In this wheel bearing device, the radial dimensions of the plastically deformed portion 34 and the pilot part 35 of the stem part 45 and a punch 60 have the following relationship:

(1) As shown in FIG. 2, of the inner periphery of the wheel hub 10, the inside diameter or pilot diameter $\Phi d4$ of the fitting face 16 that engages with the pilot part 35 is larger than the inside diameter or bottom diameter $\Phi d3$ of the broached irregularities 31 ($\Phi d4 > \Phi d3$). If $\Phi d4 \leq \Phi d3$, the fitting face 16 on the inner periphery of the wheel hub 10 will be ground during the broaching process of the irregularities 31. Since the engagement between the fitting face 16 and the pilot part 35 also functions to match the rotation centers of the inner races 27, 28 formed on the wheel hub 10 and the outer joint member 41, respectively, the dimensions of the fitting face 16 should be closely controlled.

(2) The inside diameter $\Phi d1'$ of the plastically deformed portion 34 before the plastic deformation is smaller than the outside diameter $\Phi D$ of a large diameter cylindrical part 63 of the punch 60. The inside diameter $\Phi d2$ of the pilot part 35 is larger than the outside diameter $\Phi D$ of the large diameter cylindrical part 63 of the punch 60 ($\Phi d1' < \Phi D < \Phi d2$).

In order to satisfy both of the conditions (1) and (2), the interface part 36 between the plastically deformed portion 34 and the pilot part 35 has the outer tapered face 36a and the inner tapered face 36b, both increasing toward the pilot part 35.

As mentioned in the foregoing, the general wheel bearing device takes a large bending moment when the vehicle turns. The experiment and FEM analysis conducted by the inventors showed that the pilot part 35 and the vicinities of its both axial ends are the weakest part in terms of the bending moment that is applied clockwise in the drawing, and that the bending stress concentrates particularly at the interface part 36 between the pilot part 35 and the plastically deformed portion 34. Accordingly, repeated application of bending moment loads may lead to fatigue breakage somewhere along the line between P2 and P3 in FIG. 2, P2 being the point where the outer tapered face 36a starts to increase in diameter, at one end on the outside of the plastically deformed portion 34 on the side of the pilot part 35, and P3 being the point where the inner tapered face 36b starts to decrease in diameter, at one end on the inside of the pilot part 35 on the side of the plastically deformed portion 34.

To prevent this possibility, the present invention provides means for mitigating stress concentration at the interface part 36 between the plastically deformed portion 34 and adjacent part or pilot part 35 of the outer joint member which is located inside.

One means for mitigating stress concentration is to make the thickness t of the interface part 36, or the distance between P2 and P3, as large as possible.

One possible means to increase the thickness t is to move the point P1 where the inner tapered face 36b starts to increase in diameter nearer to the pilot part 35 than the point P2 of the outer tapered face 36a. However, such change will make the plastically deformed portion 34 and the pilot part 35 overlap each other on the inside, and the fitting face 16 of the pilot part 35 may be adversely affected by the plastic deformation of the plastically deformed portion 34 when it is expanded radially outward.

Therefore, as one means of mitigating stress concentration, the ratio of the inside diameter Φd2 of the adjacent part 35 (the pilot part in the embodiment of FIG. 1) to the inside diameter Φd1 of the plastically deformed portion 34 after the plastic deformation (indicated by a broken line in FIG. 2) (Φd2/Φd1) is controlled to be within a specified limit in this invention.

By setting the upper limit of the Φd2/Φd1 ratio to be more than 1, the difference between Φd2 and Φd1 can be made smaller than that in prior art products. By thus ensuring that the pilot part 35 has smaller inside diameter Φd2, the thickness t is increased and the stress concentration can be mitigated.

FIG. 3 shows the FEM analysis results of stress concentration at the interface part 36 when subjected to the bending moment equivalent to the load in normal use with the Φd2/Φd1 ratio varied in the range of more than 1. The results show that the ratio should be 1.110 or less (Φd2/Φd1≦1.110), and more preferably 1.060 or less (Φd2/Φd1≦1.060).

On the other hand, in case of Φd2=Φd1, the punch 60 may interfere with the inner periphery of the pilot part 35 when it is withdrawn from the inner periphery of the outer joint member 41. Thus, the ratio Φd2/Φd1 should preferably be more than 1, and more preferably 1.010 or more.

As the concrete configuration of the bearing device, the fitting member may be an outer joint member of a constant velocity joint, in which case one of the wheel hub and the outer joint member is arranged on the inside and processed to have the swaged or radially expanded portion, and the other arranged on the outside. In either case, the double-row inner races may be formed on an outer periphery of the wheel hub and on an outer periphery of the outer joint member, respectively (see FIGS. 1 and 5).

Alternatively, the fitting member may be an inner ring fitted onto the wheel hub. In this case, the double-row inner races may be formed on an outer periphery of the wheel hub and on an outer periphery of the inner ring, respectively (see FIG. 6). Further, the inner races may be formed on an outer periphery of two inner rings fitted onto the wheel hub, respectively (see FIG. 7).

BRIEF DESCRIPTION OF THE DRAWINGS

FIG. 3 shows the results of FEM analysis of the correlation between Φd2/Φd1 and stress concentration;

DETAILED DESCRIPTION OF THE PREFERRED EMBODIMENTS

Preferred embodiments of the present invention will be hereinafter described with reference to FIG. 1 to FIG. 7.

Figure 1:
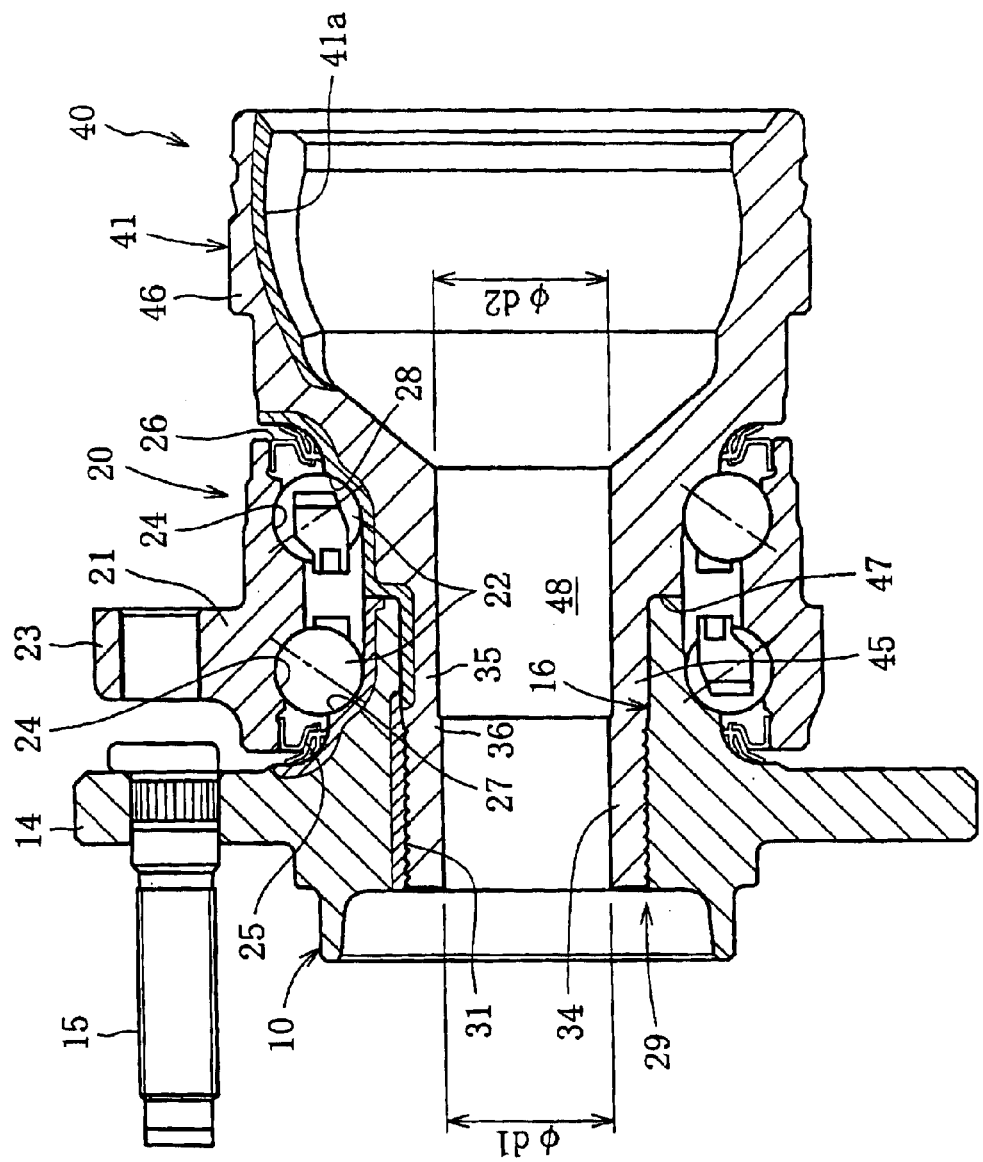
FIG. 1 is a cross section of a wheel bearing device according to one embodiment of the invention.
Figure 2:
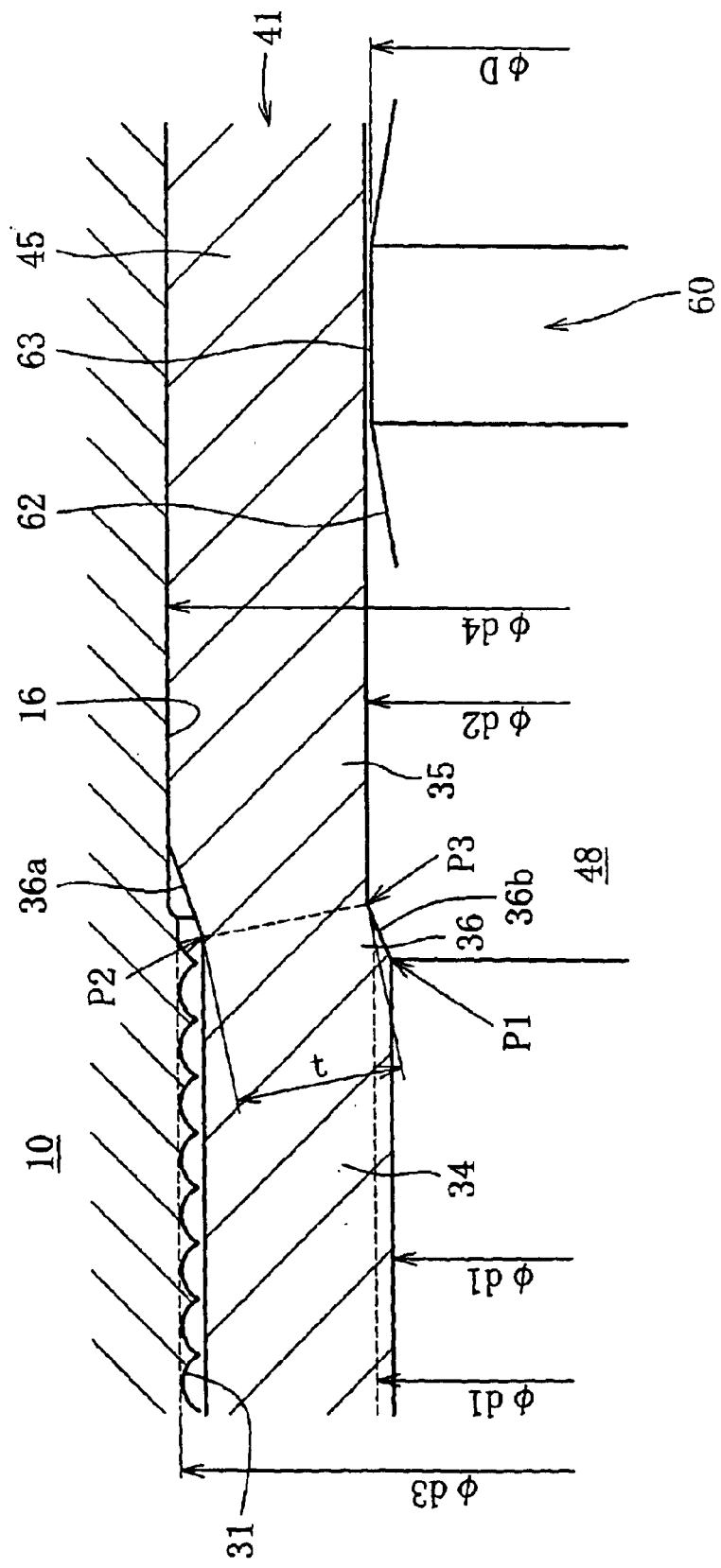
FIG. 2 is an enlarged cross section illustrating major parts of the bearing device of FIG. 1.

FIG. 1 illustrates a drive wheel bearing device according to the invention. The wheel bearing device is made as one unit of a wheel hub 10, a bearing 20, and a constant velocity joint 40. "Outboard side" and "inboard side" in the following description refer to the outer side and the inner side of the bearing device mounted on a vehicle, which correspond to the left side and the right side in the drawing, respectively.

The wheel hub 10 is a hollow member having an axial bore in the center. A flange 14 is formed at one end of the wheel hub 10 on the outboard side for attaching a wheel (not shown). In the flange 14 are wheel stud bolts 15 at circumferentially evenly spaced locations for fixedly attaching a wheel disc. The outboard-side inner race 27 is formed on an outer face of the wheel hub 10 on the inboard side of the flange 14.

The constant velocity joint 40 transmits torque from the drive shaft via its inner joint member 42 and torque transmission balls 43 (see FIG. 5) to its outer joint member 41. A plurality of track grooves 41a are formed in the inner periphery of the outer joint member 41. These track grooves 41a form a plurality of ball tracks together with corresponding track grooves 42a (see FIG. 5) formed in the outer periphery of the inner joint member 42. The torque transmission balls 43 are arranged in these ball tracks and held in the same plane by a cage 44.

The outer joint member 41 is a fitting member that fits into the wheel hub 10 and includes a stem part 45 and a mouth part 46 made as one-piece. The stem part 45 is fitted into the inside of the wheel hub 10 until the shoulder 47 of the mouth part 46 abuts on the inboard-side end face of the wheel hub 10, whereby relative positioning of the wheel hub 10 and the outer joint member 41 is achieved in the axial direction. This abutment also defines the distance between the two inner races 27, 28. The inboard-side inner race 28 is formed on an outer face of the mouth part 46 near the shoulder 47. The stem part 45 is tubular with an axial bore 48 that communicates to the bottom of the cup-shaped mouth part 46.

The stem part 45 includes a portion 34 that is plastically deformed radially outward in the swaging process to be described later at one shaft end on the outboard side. On the inboard side of the pastically deformed portion 34 is formed a cylindrical adjacent part or pilot part 35 having a different inside diameter than that of the plastically deformed portion 34, and in between the plastically deformed portion 34 and the pilot part 35 is formed an interface part 36 having an outer tapered face 36a and an inner tapered face 36b, the taper increasing toward the inboard side(dee FIG. 2).

For the material of the outer joint member 41, carbon steel such as S40C and S53C, and a wide range of carbon steels for mechanical structure which contain 0.30 to 0.61% carbon (as specified by JIS) can be used. Also, a steel material chiefly containing iron and containing 0.5 to 0.7 wt % carbon, 0.6 to 1.2 wt % silicon, and 0.6 to 1.0 wt % mananese, and other inevitable impurities, can be used.

The outer joint member 41 is formed of the above material by a forging process, after which it undergoes partial heat treatment. Hatching patterns in FIG. 1 indicate portions that are hardened by the heat treatment: The region covering the pilot part 35, the shoulder 47, inboard-side inner race 28, and a seal land with which a seal lip of a seal 26 makes sliding contact; and the region inside the mouth part 46 covering the track grooves 41a in which the torque transmission balls roll. They are both hardened to HRC 58 or more. For the heat treatment of these parts, high frequency quenching is most suitable, as it is capable of local heat application and allows free selection of case depth, while causing little thermal effects on the mother material of non-hardened parts.

Other parts including the plastically deformed portion 34 of the stem part 45 are not hardened after forging. Of these non-hardened parts, the plastically deformed portion 34 should preferably have as low a hardness as possible in view of the workability in swaging, to an extent that does not lead to deterioration of fatigue durability. Thus the preferable range of hardness for the plastically deformed portion 34 is HRC 13 to 28, and more preferably HRC 18 to 25.

The bearing 20 includes the outer member 21 and double-row rolling elements 22. The outer member 21 includes a flange 23 for attachment onto the vehicle body (not shown) and is formed with the double-row outer races 24 on the inside on which the double-row rolling elements 22 roll. The double-row rolling elements 22 are accommodated in between the inner races 27, 28 on the wheel hub 10 and the outer joint member 41 and the double-row outer races 24 on the outer member 21. Although this embodiment shows by way of example a double-row angular contact bearing in which rolling elements 22 are balls, it should be noted that heavy automobile wheel bearing assemblies often employ double-angular tapered roller bearings, in which case they are tapered rollers. Seals 25, 26 are provided to either open end of the outer member 21 to prevent leakage of grease filled inside the bearing and penetration of water or foreign matter from outside.

The wheel hub 10 is formed with irregularities 31 on the inner periphery opposite the outer periphery of the plastically deformed portion 34 of the outer joint member 41. On the inboard side of the irregularities 31 is a fitting face 16 that makes tight contact with the outer face of the pilot part 35 of the stem part 45. This engagement between them bears the bending moment applied to the bearing device.

The irregularities 31 can be formed by broaching or the like and can take any form such as threads, serrations including splines, and diamond-patterned knurls which are formed by intersecting parallel double-row grooves with each other. These irregularities 31 are hardened to HRC 58 or more by heat treatment.

The wheel hub 10 has a hardened layer not just in the region covering the irregularities 31 on the inner periphery but also in a region on the outer periphery covering the seal land of the seal 25 over the inner race 27 up to the end face on the inboard side, as indicated by the hatching pattern in FIG. 1. The heat treatment should preferably be achieved by high frequency quenching for the same reasons as noted above. Making these hardened layers uncontinuous with each other as illustrated can prevent quenching cracks in the wheel hub 10.

The wheel hub 10 as the inside member and the outer joint member 41 as the fitting member are plastically joined together by swaging radially outward. After fitting the stem part 45 of the outer joint member 41 inside the wheel hub 10, the plastically deformed portion 34 of the stem part 45 is plastically deformed radially outward, causing the outer periphery of the plastically deformed portion 34 to bite into the irregularities 31, thereby joining the wheel hub 10 and the outer joint member 41. This coupling determines the distance between the two inner races 27, 28 and applies a preset preload to the inside of the bearing 20. The wheel hub 10 and the outer joint member 41 coupled together form the inner member 29 that has the double-row inner races 27, 28 on the outer periphery thereof.

The irregularities 31 will hardly yield to the pressure applied by swaging because they are hardened to a high degree as noted above. The plastically deformed portion 34, on the other hand, has a lower hardness than that of the irregularities 31 and high ductility. It can therefore be formed with a large thickness for the swaging without raising the risk of swaging cracks in the stem part 45. Accordingly, the swaging makes the irregularities 31 bite deeply into the plastically deformed portion 34, thereby securing high joint strength between the wheel hub 10 and outer joint member 41.

Figure 4:
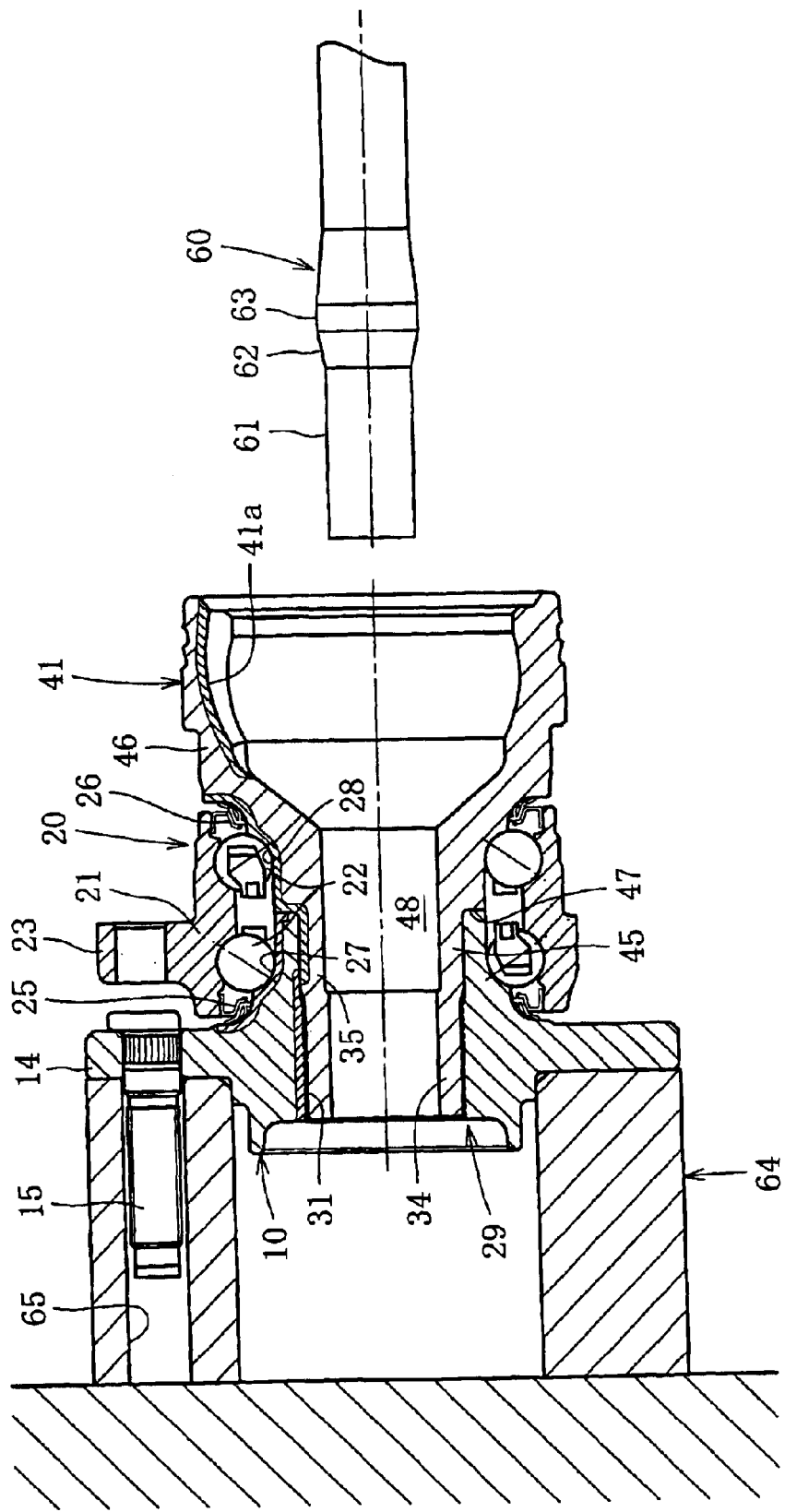
FIG. 4 is a cross section of the wheel bearing device in a swaging process.

The swaging is performed, for example, using a swaging tool or punch 60 inserted into the axial bore 48 of the stem part 45 of the outer joint member 41, as shown in FIG. 4. The swaging tool 60 has a small diameter cylindrical part 61, a tapered part 62, and a large diameter cylindrical part 63 from the tip that is inserted into the stem 45. The outside diameter of the small diameter cylindrical part 61 is smaller than the inside diameter $\Phi d1'$ (see FIG. 2) of the plastically deformed portion 34 before it is swaged, whereas the outside diameter of the large diameter cylindrical part 63 is larger than this inside diameter $\Phi d1'$.

When swaging, the bearing device is set on a workbench 64, with the outer joint member 41 fitted into the wheel hub 10. The end face of the flange 14 on the outboard side is held on the workbench 64, with the wheel stud bolts 15 accommodated in bolt holes 65 formed in the workbench 64.

In this state, the swaging tool 60 is pressed into the axial bore 48 of the outer joint member 41 from the inboard side. The tapered part 62 and large diameter cylindrical part 63 of the tool 60 expand the portion 34 of the stem part 45 by plastic deformation, whereby the outer periphery of the plastically deformed portion 34 bites into the irregularities 31 on the inner periphery of the wheel hub 10.

The outer joint member 41 is subjected to pressure toward the outboard side as the swaging tool 60 is driven into it. Since the wheel hub 10 held on the workbench 64 counteracts this force, the parts of the wheel hub 10 and the outer joint member 41 making contact with each other in the axial direction (shoulder 47 of the outer joint member 41 and the end face of the wheel hub 10 on the inboard side) are deformed by compression. Thereby, the axial internal clearance is made negative, giving preload to the bearing 20. Preload application is thus achieved at the same time with the completion of the swage-coupling. The above effects are basically achieved by inserting the swaging tool 60 in a direction in which the compression deformation occurs in the axially mating parts of two members that are swage-coupled.

The swaging must achieve more than a certain degree of radial expansion of the plastically deformed portion 34 so that it can bite into the irregularities 31 to a sufficient extent. For this reason, the ratio $\Delta$ of the inside diameter $\Phi d1$ after the swaging to the inside diameter $\Phi d1'$ of the plastically deformed portion 34 before the swaging ($\Delta = \Phi d1 / \Phi d1'$) should be 1.05 or more. On the other hand, excessive radial expansion may lead to troubles such as cracks due to excessive stretch of the material. Therefore, the above ratio $\Delta$ should have an upper limit in the range of from 1.14 to 1.20 depending on the amount of carbon contained in the material of the plastically deformed portion 34.

The bearing device according to the invention is provided with the stress alleviating means for the interface part 36 of the outer joint member 41 as described above. In this embodiment, the stress alleviating means is a specified upper limit for the ratio of the inside diameter $\Phi d2$ of the pilot part 35 to the inside diameter $\Phi d1$ of the plastically deformed portion 34 after the swaging, so that the inside diameter $\Phi d2$ of the pilot part 35 is smaller than that of prior art products. This ensures that the thickness t (see FIG. 2) of the interface part 36 between the radial expansion start point P2 of the outer tapered face 36a and the radial contraction start point P3 of the inner tapered face 36b is larger than that of the prior art products, whereby fatigue breakage of this part caused by repeatedly applied bending moment load is prevented and durability and life of the bearing device can be improved.

More specifically, $\Phi d2/\Phi d1$ should be 1.110 or less as noted above, and more preferably 1.060 or less, to achieve the above effects.

On the other hand, the $\Phi d2/\Phi d1$ ratio should be at least more than 1, and more preferably, 1.010 or more, so as to prevent the punch 60 from interfering with the inner periphery of the pilot part 35 when pulling it out of the outer joint member 41 after the formation of the plastically deformed portion 34.

Figure 5:
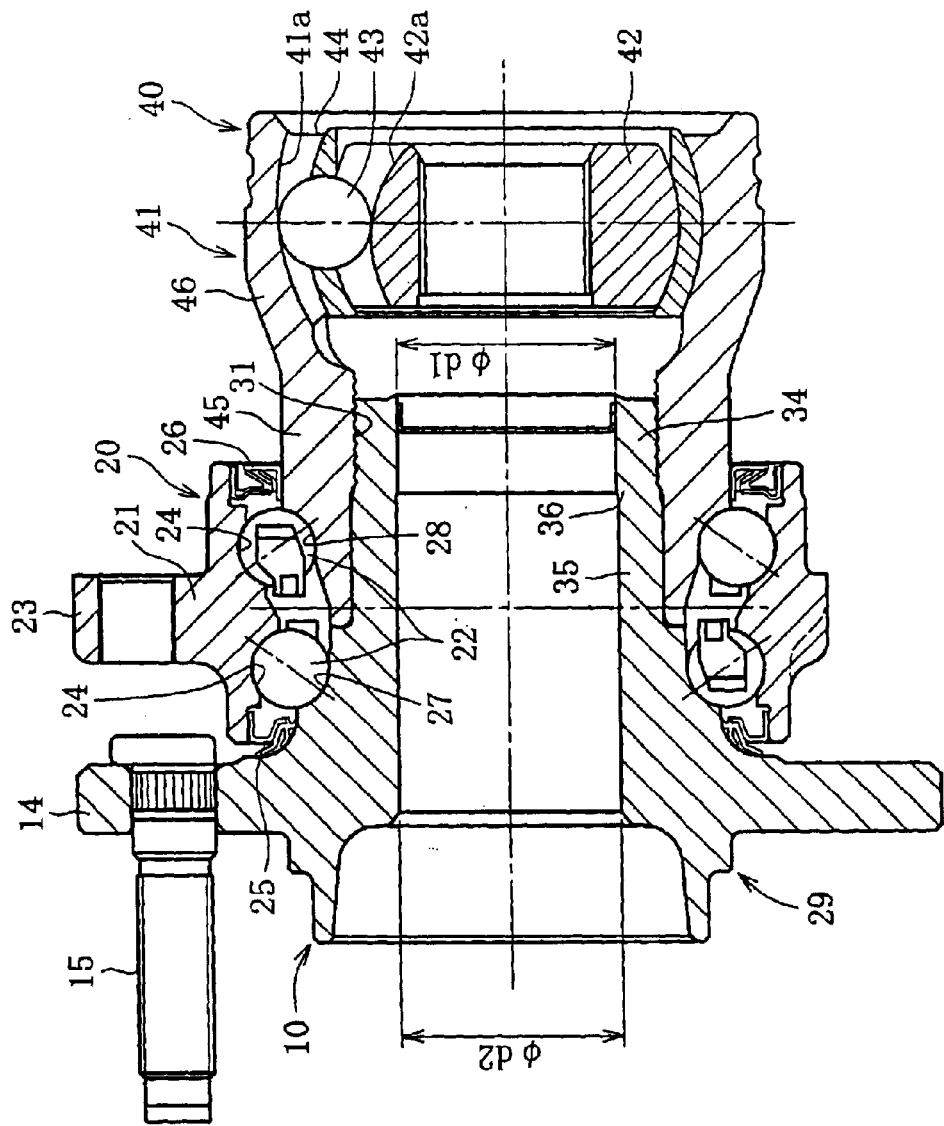
FIG. 5 is a cross section of a wheel bearing device according to another embodiment of the invention.

While FIG. 1 shows one example in which the wheel hub 10 is arranged outside in the swaged portion, the outer joint member 41 may be arranged on the outside as shown in FIG. 5. In this case the wheel hub 10 inside is formed with the plastically deformed portion 34, and the outer joint member 41 is fitted onto that plastically deformed portion. The plastically deformed portion 34 is formed at the inboard-side end of the wheel hub 10, with the interface part 36 and the pilot part 35 formed on its outboard side. The inside diameter $\Phi d2$ of the pilot part 35 is larger than the inside diameter $\Phi d1$ of the plastically deformed portion 34 after the swaging, the $\Phi d2/\Phi d1$ ratio being set as noted above to achieve the aforementioned effects.

Other embodiments of the invention will be described next with reference to FIG. 6 and FIG. 7, in which other types of wheel bearing devices are employed. Elements that have the same functions as those of FIG. 1 are given the same reference numerals and the repetitive description thereof will be omitted.

Figure 6:
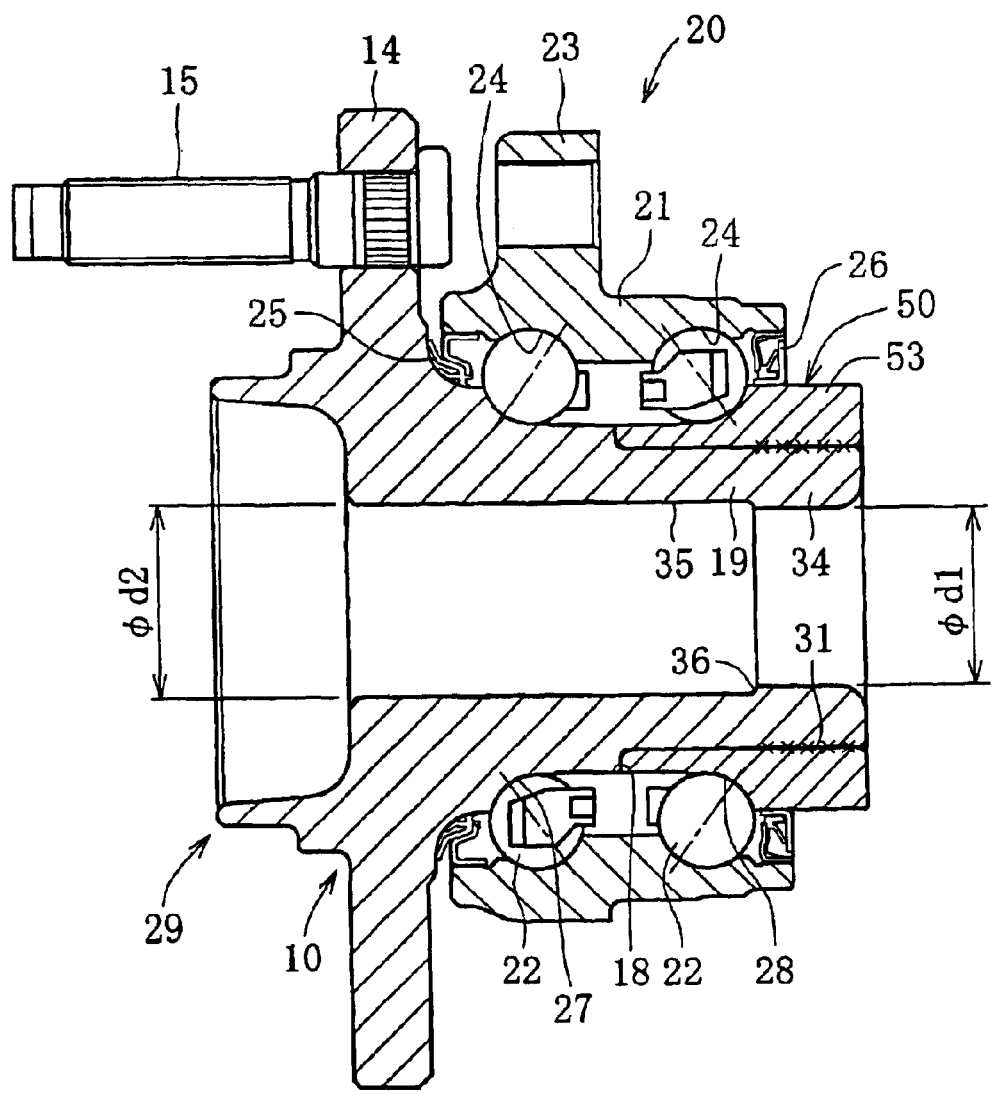
FIG. 6 is a cross section of a wheel bearing device according to yet another embodiment of the invention.

FIG. 6 shows one embodiment in which an inner member 29 is constituted by a wheel hub 10 and an inner ring 50 fitted onto the wheel hub 10. The inner member 29 has inner races 27 and 28. The outboard-side inner race 27 is formed on an outer periphery of the wheel hub 10, and the inboard-side inner race 28 is formed on an outer periphery of the inner ring 50.

In this embodiment, the inner ring 50 is press-fitted onto a small-diameter cylindrical part 19 at the inboard-side end of the wheel hub 10. The end face on the outboard side of the inner ring 50 is abutted on the shoulder 18 of the wheel hub 10.

In this embodiment, the plastically deformed portion 34 is formed in the small-diameter cylindrical part 19 of the wheel hub 10, at a location nearer to the inboard side than the inboard-side inner race 28 (on the inboard side of an intersection with an extension line of the contact angle of the balls). Hardened irregularities 31 are formed in the inner periphery of an extended part 53 of the inner ring 50 at the inboard-side end opposite the plastically deformed portion 34 as indicated by cross marks in the drawing. The plastically deformed portion 34 of the wheel hub 10 is not hardened, and it is expanded radially outward by plastic deformation, so that the plastically deformed portion 34 bites into the irregularities 31 on the inner ring 50, thereby plastically coupling the wheel hub 10 and the inner ring 50 together. In this case, the wheel hub 10 is a member that is located inside, and the inner ring 50 constitutes a fitting member that is fitted onto the wheel hub 10.

The cylindrical part of the wheel hub 10 adjoining the plastically deformed portion 34 on the outboard side constitutes an adjacent part 35 with a different inside diameter, and the interface part 36 is formed between the adjacent part 35 and plastically deformed portion 34. The inside diameter $\Phi d2$ of the adjacent part 35 is larger than the inside diameter $\Phi d1$ of the plastically deformed portion 34 ($\Phi d2 > \Phi d1$).

In this embodiment, the $\Phi d2/\Phi d1$ ratio is set within the limit noted above to achieve the same effects as described above.

Figure 7:
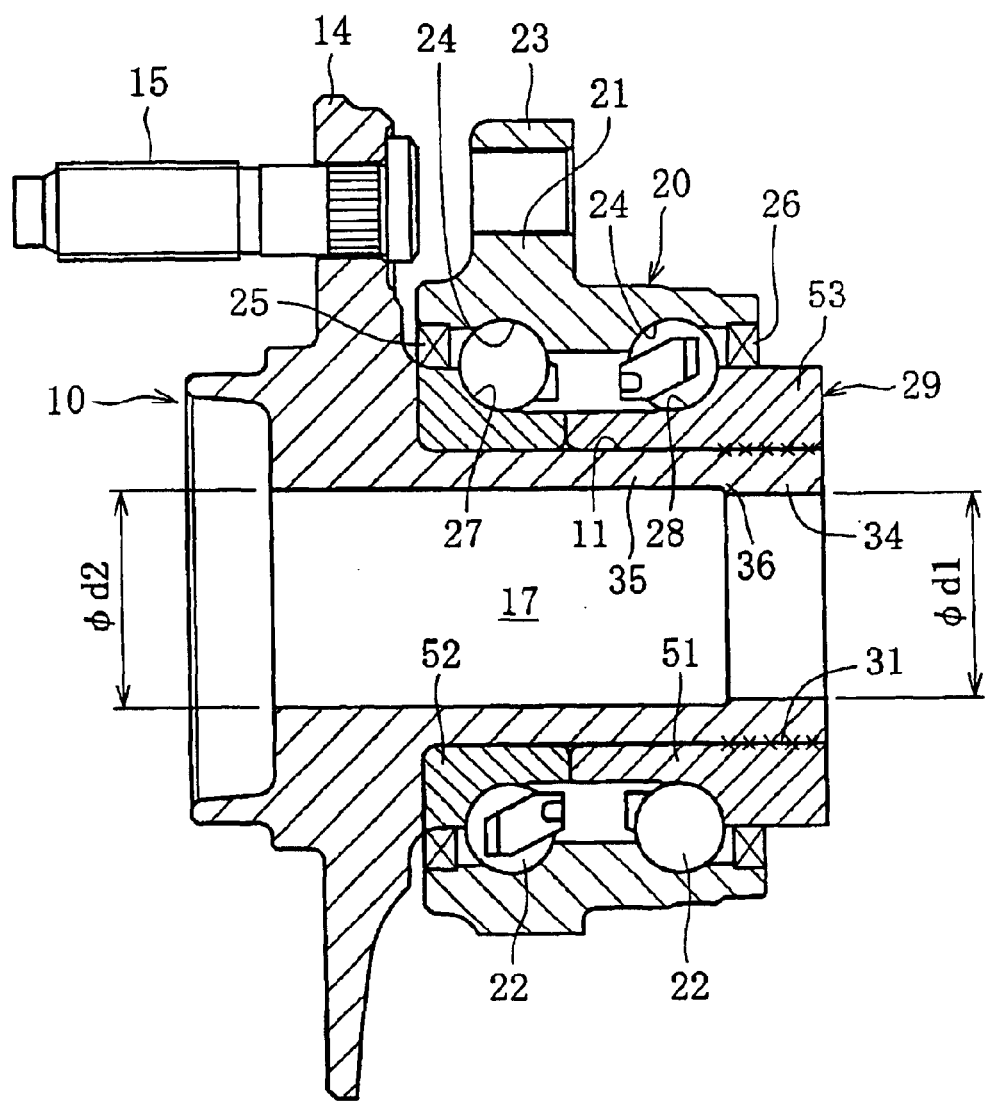
FIG. 7 is a cross section of a wheel bearing device according to a further embodiment of the invention.

FIG. 7 shows another embodiment in which an inner member 29 is formed by a wheel hub 10, and a first inner ring 51 and a second inner ring 52 fitted onto the wheel hub 10. The inner member 29 has its inner races 27, 28 on the outer peripheries of the inner rings 51, 52, respectively. An outer joint member, which is not shown, is fitted into the wheel hub 10 and connected thereto such as to transmit torque.

The first inner ring 51 on the inboard side has an axial extension 53 at one end on the inboard side, which is formed with hardened irregularities 31 on the inside, as indicated by cross marks. The plastically deformed portion 34 is provided at one end on the inboard side of the wheel hub 10, which is not hardened so that it is expanded radially outward by plastic deformation and firmly engaged with the irregularities 31, thereby plastically coupling the wheel hub 10 and the inner ring 51. In this case, the wheel hub 10 is a member that is located inside, and the inner rings 51, 52 constitute a fitting member that fits onto the wheel hub 10.

In this embodiment, the cylindrical part of the wheel hub 10 adjoining the plastically deformed portion 34 on the outboard side constitutes an adjacent part 35, and the interface part 36 is formed between the adjacent part 35 and plastically deformed portion 34. The inside diameter $\Phi d2$ of the adjacent part 35 is larger than the inside diameter $\Phi d1$ of the plastically deformed portion 34 ($\Phi d2 > \Phi d1$).

In this embodiment, too, the $\Phi d2/\Phi d1$ ratio is set within the limit noted above to achieve the same effects as described above.

Although FIG. 6 and FIG. 7 show examples of wheel bearing devices used in driven wheel applications and composed of only the wheel hub 10 and bearing 20 as one unit without the outer joint member 41, the wheel bearing device of the invention can obviously be applied to a drive wheel, which includes the outer joint member 41 in the unit.

According to the present invention, the bending stress applied to the interface part between the adjacent part and the plastically deformed portion, which is the weakest part of the bearing device, is alleviated by the stress alleviating means, and therefore the durability and life of the bearing device can be improved, even with repeated applications of large bending moment. The invention also ensures that the swaging tool does not interfere with the inner periphery of an inner member when pulling out the tool after the radially outward plastic deformation of the plastically deformed portion, whereby the swaging operation efficiency is improved.

What is claimed is:

1. A wheel bearing device comprising:

an outer member formed with double-row outer races on an inner periphery thereof;

an inner member formed with double-row inner races on an outer periphery thereof, the inner member including a wheel hub with a flange for attachment of a wheel and a fitting member fitted to one of an inner periphery or an outer periphery of the wheel hub, one of the wheel hub and the fitting member that is located inside including a plastically deformed portion radially expanded by plastic deformation to be coupled with the other one of the wheel hub and the fitting member that is located outside and an adjacent part adjoining the plastically deformed portion with a different inside diameter than that of the plastically deformed portion;

double-row rolling elements interposed between the outer races and the inner races; and stress alleviating means for mitigating stress concentration at an interface part between the plastically deformed portion and the adjacent part of the one that is located inside.

2. The wheel bearing device according to claim 1, wherein the stress alleviating means is a specified ratio of an inside diameter $\Phi d2$ of the adjacent part to an inside diameter $\Phi d1$ of the plastically deformed portion after the plastic deformation, the ratio being 1.110 or less.

3. The wheel bearing device according to claim 2, wherein the $\Phi d2/\Phi d1$ ratio is more than 1.

4. The wheel bearing device according to any one of claims 1 to 3, wherein the fitting member is an outer joint member of a constant velocity joint, the double-row inner races being formed on an outer periphery of the wheel hub and on an outer periphery of the outer joint member, respectively.

5. The wheel bearing device according to any one of claims 1 to 3, wherein the fitting member is an inner ring fitted to an outer periphery of the wheel hub.

6. The wheel bearing device according to claim 5, wherein the double-row inner races are formed on an outer periphery of the wheel hub and on an outer periphery of the inner ring, respectively.

7. The wheel bearing device according to claim 5, wherein the double-row inner races are formed on respective outer peripheries of two inner rings fitted to the outer periphery of the wheel hub.

* * * * *